(12) United States Patent
Banks

(10) Patent No.: US 7,593,808 B2
(45) Date of Patent: *Sep. 22, 2009

(54) APPARATUS AND METHOD FOR ENGINE PERFORMANCE EVALUATION

(76) Inventor: Gale C. Banks, 157 Sawpit La., Bradbury, CA (US) 91010

( * ) Notice: Subject to any disclaimer, the term of this patent is extended or adjusted under 35 U.S.C. 154(b) by 267 days.

This patent is subject to a terminal disclaimer.

(21) Appl. No.: 11/835,346

(22) Filed: Aug. 7, 2007

(65) Prior Publication Data

US 2009/0043485 A1 Feb. 12, 2009

(51) Int. Cl.
*F02D 41/00* (2006.01)
*G06F 17/00* (2006.01)

(52) U.S. Cl. ............ 701/114; 701/102; 73/118.02
(58) Field of Classification Search ........ 701/114, 701/115, 102, 101; 73/117.3, 118.2; 123/399, 123/361, 352
See application file for complete search history.

(56) References Cited

U.S. PATENT DOCUMENTS

| 3,836,128 | A | * | 9/1974 | Lunsford ............ 261/39.2 |
| 4,856,475 | A | | 8/1989 | Shimomura et al. ..... 129/339.21 |
| 5,490,417 | A | * | 2/1996 | Nakajima ............ 73/114.32 |
| 6,512,974 | B2 | | 1/2003 | Houston et al. ........ 701/115 |
| 6,539,299 | B2 | | 3/2003 | Chatfield et al. ....... 701/115 |
| 7,254,477 | B1 | | 8/2007 | Banks ................ 701/114 |

* cited by examiner

*Primary Examiner*—Hieu T Vo
(74) *Attorney, Agent, or Firm*—Connolly Bove Lodge & Hutz LLP

(57) ABSTRACT

A system that measures the density of the air in the intake of an internal combustion engine and calculates the gain or loss in performance provides a display to an operator in real time in a single, quickly assimilated reading. A display can indicate the combined power increasing effects of turbo/superchargers that increase density and power by compressing the air, as well as charge air coolers that increase density by decreasing the temperature. Density can be measured directly, or calculated from sensor readings. Densities, as well as temperatures and pressures can be displayed as absolute values, as percentage gains or losses verses a known reference such as ambient, or as a loss or gain between density increasing devices to indicate the individual performance of the component. One embodiment incorporates a cradle mounted PDA type handheld computing device on the dashboard to provide the display, input/output and processing hardware.

18 Claims, 8 Drawing Sheets

US 7,593,808 B2

APPARATUS AND METHOD FOR ENGINE PERFORMANCE EVALUATION

STATEMENT OF RELATED APPLICATIONS

This application claims priority from Provisional Application Ser. No. 60/663,021, filed Mar. 17, 2005, and claims priority from application Ser. No. 11/384,193, filed Mar. 17, 2006, now U.S. Pat. No. 7,254,477, the disclosures of which are incorporated herein by reference.

BACKGROUND OF THE INVENTION

The field of the present invention is measurement of engine performance.

Internal combustion engines produce power by using the oxygen in air to burn fuel to produce heat, which is then converted into mechanical power. The primary factor controlling the maximum available power level of any given internal combustion engine is the amount of air (and therefore oxygen) that is available to burn fuel. Since burning fuel is a chemical reaction, there are appropriate ratios of the number of oxygen molecules needed to burn the fuel molecules present with optimum combustion efficiency and minimum harmful exhaust by products.

The volume of air available is not alone determinative of how many oxygen molecules will be present. How closely the molecules are packed into this volume, density, must also be measured. Density is measured as mass of air divided by the volume occupied by that mass of air. For "ideal gasses" like air, this relationship is defined by the Ideal Gas Law as $PV=nRT$. In this equation, P is pressure, V is volume, n is the number of molecules, R is a constant depending on the units used, and T is temperature. This can be algebraically rearranged to $nR/V=P/T$. This shows that to increase the number of molecules of air (n) in a fixed volume (V), you must either increase the pressure (P), or decrease temperature (T), or do both. This relationship additionally explains why the power output of internal combustion engines, particularly those which are normally aspirated, are affected by the prevailing ambient air conditions of temperature and barometric pressure, as this determines the maximum available intake air density, and therefore the maximum power.

Another factor impacting the number of oxygen molecules is a variation in the constituent mixture of air. Humidity is the only significant natural variable in the constituent mixture as applied to conventionally employed engines. By contributing water molecules to the mixture defining ambient air, humidity has an impact on the percentage of the mix which is oxygen. The influence of humidity is not reflected in the Ideal Gas Law but, when the water remains in a gaseous state, humid air mixture also can be considered to conform to the ideal gas model. Albeit impacting on engine performance, humidity is usually not controlled or controllable in internal combustion engines.

The intake air density can be intentionally changed to control the power output. A spark ignition (SI or Otto cycle) internal combustion engine uses, changes in intake air density as the primary means for controlling power output levels. This method is somewhat unique to SI engines because they must operate within a relatively narrow range of allowable air/fuel ratios. They are unable to reduce power output, for example, by simply restricting the fuel input while running with excess air as can a compression ignition (CI or Diesel cycle) engine. SI engines typically limit power by lowering the engine intake air density below ambient pressure with a throttle. This is a valve located in the intake air tract that generates an adjustable pressure drop in the flow of intake air as it is closed, thereby controllably decreasing the density and, therefore, the power level.

At maximum power, normally aspirated SI and CI engines face the same limitation: they cannot burn more fuel than the amount of oxygen available in air at existing atmospheric pressures and temperatures. Modern high performance engines frequently employ devices to increase the available engine power beyond this limitation by compressing the intake air to increase its density. This is commonly accomplished with devices called turbochargers or superchargers.

Unfortunately, compressing air-causes an increase in the air temperature. Looking again at the Ideal Gas Law: an increase in temperature adversely affects density. However, the temperature of the compressed air is now above ambient, creating an opportunity for easily transferring heat and thereby further increasing density and the obtainable power. Temperature reduction can be accomplished with heat exchange devices commonly called charge air coolers and intercoolers Thus, mechanisms are available for modifying the limitations on SI and CI engines. Resulting density is a principal factor in the effectiveness of such modifications.

Various devices are known to monitor and control certain engine functions. Devices to indicate power level for engines using turbochargers or superchargers are known which measure the intake manifold pressure. These are commonly called "boost" gauges as they measure the additional pressure above atmospheric provided by the turbocharger or supercharger to "boost" the power output. Some versions also indicate pressure below atmospheric as a manifold vacuum gauge for an SI engine, or both above and below sea level ambient as in an aircraft manifold "absolute pressure" gauge. This gives the operator of an SI engine at full throttle or a CI engine at the maximum fuel setting a rough indication of the effectiveness of the boost device and of its relative impact on power produced.

Devices to measure manifold temperatures are also available. These can measure the effectiveness of an intercooler or reflect adverse engine conditions. They do not provide any measure of engine performance.

The equivalent of density measurements are available for use for internal engine control. Many modern computer controlled SI engines measure both intake manifold air temperature and pressure for use in determining the amount of fuel that is required to achieve the optimum air/fuel ratio. They do not, however, make this information available to the operator. Density measurements are unknown for application as a means for indicating component and system performance or power levels to the operator of the internal combustion engine.

Some CI systems indicate engine "load" based on the quantity of fuel supplied. They cannot sense when ambient conditions, or a system malfunction or degradation is limiting available air density, impacting power.

Personal Digital Assistants (PDA) or similar small hand held computers are used with engines to compute or display engine or vehicle data. Such devices principally have been diagnostic tools to measure various engine parameters and signals which do not provide an indication of overall performance.

SUMMARY OF THE INVENTION

The present invention is directed to a system for indicating the performance of an internal combustion engine, including method and apparatus. An air density sensor is disposed in the intake of an internal combustion engine and produces an output signal that is a function of the density of the air in the intake. A converter is in communication with the air density sensor.

In a first separate aspect of the present invention, the converter capable of receiving the output signal and converting the output signal to a calculated output which is a function of the power of the internal combustion engine based at least in part on the output signal.

In a second separate aspect of the present invention, an air density sensor is used which includes a gas tight flexible container with gas disposed therein and a pressure sensor to generate the output signal. The gas is provided in a predetermined quantity selected to produce a pressure within the flexible container that is a function of the density of the air in the internal combustion engine intake.

In a third separate aspect of the present invention, the air density sensor includes a pressure sensor and a temperature sensor to generate the output signal. The pressure sensor and the temperature sensor are in close physical proximity within the intake.

In a fourth separate aspect of the present invention, the converter is a digital processor and may, more specifically, be a PDA.

In a fifth separate aspect of the present invention, an internal combustion engine includes a variable volume internal combustion engine with an intake. The internal combustion engine further includes an air density sensor for producing an output signal as a function of the density of the air in the intake. The converter provides output signals in units reflecting engine performance.

The internal combustion engine may include a plurality of air density sensors, may include at least one density changing device and may include the sensing of other engine operating conditions to augment accurate determination of performance levels.

In a sixth separate aspect of the present invention, a method for displaying the performance level of an internal combustion engine includes sensing the density of the air flowing in the intake, generating an output signal that is a function of the density sensed, and converting the density signal to a calculated output which is a function of the power of the internal combustion engine based at least in cart on the output signal.

In a seventh separate aspect of the present invention, a plurality of density sensors are contemplated for placement at locations relative to one or more density changing devices. Signals are generated at least as a function of density at the sensor locations and output signals are generated that are a function of at least the density at the sensor locations. The output signals can be converted to a calculated output which is a function of the effectiveness of at least one density changing device of the internal combustion engine based at least in part on the output signal.

In an eighth separate aspect of the present invention, sensors in addition to density sensors are contemplated to augment indication of performance. Sensors for engine speed, humidity, flow rate and power demand are contemplated.

In a ninth separate aspect of the present invention, any of the foregoing aspects are contemplated to be combined to greater advantage.

Accordingly, it is an object of the present invention to provide improved performance sensing systems and methods. Other and further objects and advantages will appear hereinafter.

DETAILED DESCRIPTION OF THE PREFERRED EMBODIMENTS

Figure 1:
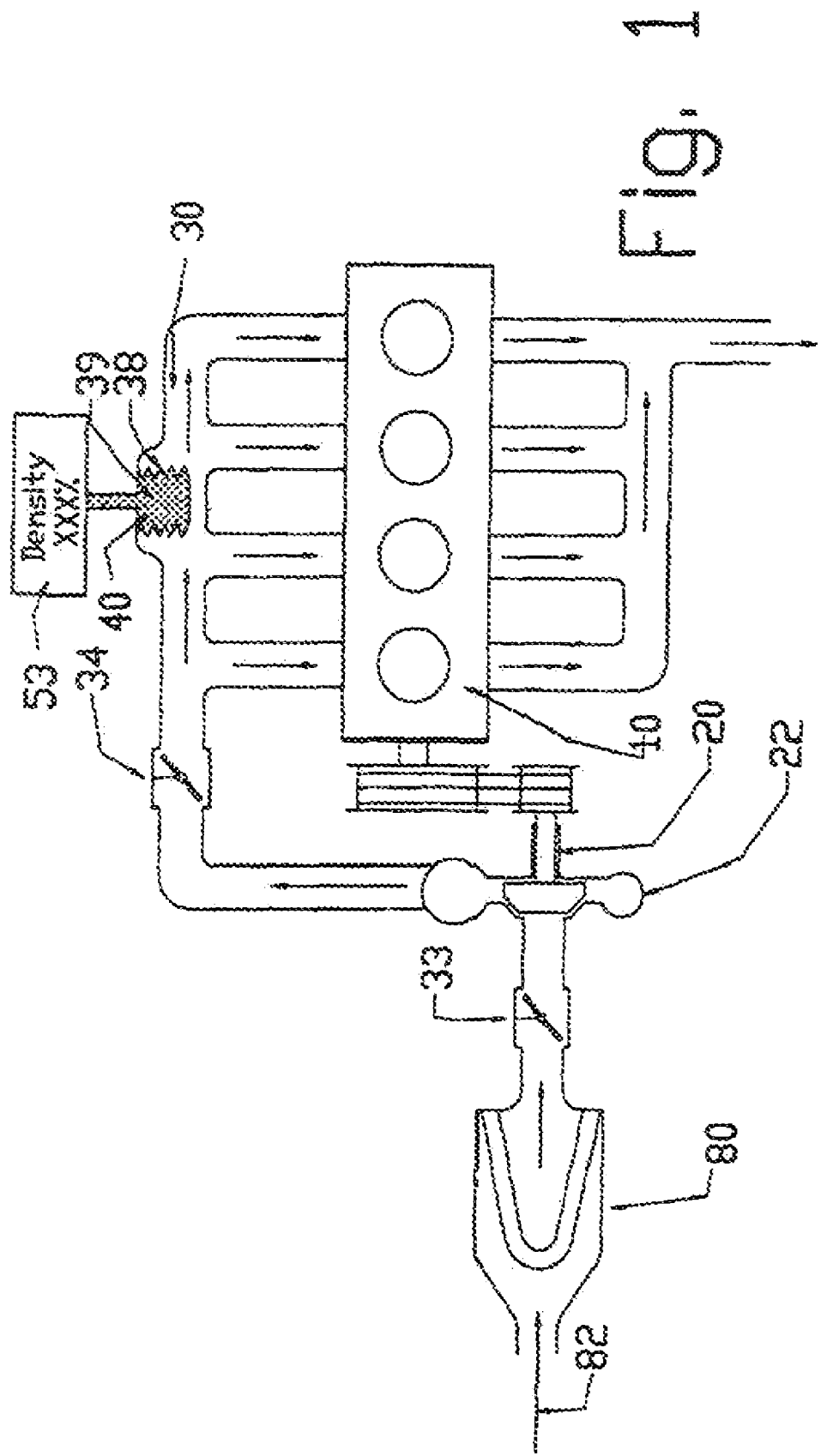
FIG. 1 is a schematic view of an internal combustion engine with an "all-mechanical" density sensor.

The preferred embodiments, systems of apparatus and method, sense and determine the density of the air at one or more strategic locations in the intake system of an internal combustion engine, and present this information to the operator in useful forms indicative of internal combustion engine performance including power and, more directly, that of the intake system. Various embodiments can include predictions of engine power levels based on density gains or losses, and present this data to the operator in real time. Power is predicted by establishing power at a first density and speed and then estimating power through changes in density brought about by changes in density changing devices. Multiple reference points with established power data assist in this prediction. Empirical functions can then be developed, specific to each type of engine, to predict power based on changes in density with engine components other than the density changing devices remaining constant. Other engine parameters can be sensed and provided to the display to accommodate for other power impacting variables.

The systems accommodate various density changing devices employed on the engine. "Density changing devices" are here defined as a category of devices that have an effect on the intake air density by either increasing or decreasing it. This category includes devices that increase the density of the air by compressing it, like a supercharger or turbocharger, devices that increase the density of the air by cooling it, like charge air coolers, and conversely, devices that decrease the density by lowering the pressure, either intentionally such as by a throttle valve or unintentionally such as through an improper or spent air filter.

The systems are compatible with sensors capable of determining the density directly, indirectly, or in combination. The systems are independent of internal combustion engine type. However, if enhanced readings for predicting power levels are provided, additional sensors may be required or advantageous. For example, fuel settings for CI engines and engine speed allow calculation of power for internal combustion engines that operate at more than one speed.

A number of air density sensors are disclosed. The term "density sensor" is used here regardless of the mechanism by which the resulting density is derived. As will be disclosed, known mechanical sensors as well as separate pressure and temperature gauges with known integrating elements and computers in the form of PDAs to achieve density readings are contemplated to fall within the scope of this term.

Certain embodiments are shown to use commercially available Personal Digital Assistants, or PDA's, or similar small computing device, that has a program loaded into its memory to perform the calculation steps required to convert the raw sensor data to the units selected by the operator. A PDA can also serve as an input device to allow the operator to select the data to be displayed, and the display format. Finally, a PDA can serve as the display to show the results to the operator in the display format chosen. The mass production of PDA's commonly makes them available at a lower cost than a display for building a dedicated gauge in lower volumes. Currently available PDA's can employ interfacing circuitry to communicate with common sensors and engine data busses. As PDA's and sensors become more advanced in the future, the need for these intermediate interfacing circuits will likely be eliminated, simplifying the implementation of these systems.

A variety of density changing devices and sensor types are intermixed in the following figures and embodiment descriptions. This variety is intended to demonstrate the flexibility of the systems in a variety of applications, and to illustrate the operation of the systems in a few typical installations. These features are essentially interchangeable, and the figures and descriptions should not be construed to limit the combination to those few shown herein for the sake of brevity, but to demonstrate the flexibility of these systems.

The simplest embodiment is illustrated schematically in FIG. 1 with an internal combustion engine 10 equipped with an intake from the air cleaner 80 to the engine 10. The intake includes a density changing device in the form of a supercharger 20. The intake air 82 is drawn through the air cleaner 80 and is compressed by the 1st stage intake air compressor 22 of the supercharger 20. the compressed air then travels into the intake manifold 30 and then into the engine 10. The density level in the intake manifold 30 can be controlled via a throttle valve. This can take the form of a compressor inlet throttle 33 disposed prior to the supercharger 20, or an intake manifold throttle 34 disposed after the supercharger 20.

A mechanical air density sensor 40 is used to determine the density of the air in the intake manifold 30. The mechanical density sensor 40 includes a bellows 38 which has been evacuated and then partially filled with a reference gas such as nitrogen 39 in predetermined quantity.

Locating the mechanical density sensor 40 within the intake manifold 30 so that it is exposed to the intake airflow allows the gas within the bellows to assume the same temperature as the airflow. The combination of pressure within the intake manifold 30 and the transferred temperature cause a resulting pressure within the bellows 38 that can be calibrated to indicate the density of the intake manifold 30. The pressure provides an output signal which is in communication with a mechanical pressure sensor that provides a display 53.

The display face can be marked in units to read density directly, density gain or loss from a defined reference, or to indicate engine performance or power level as a function of density.

This embodiment would be used on engines that had little or no electronic controls, or even applications devoid of an electrical system, (i.e. compression ignition) It would also be entirely immune to severe electrical interference, including even electromagnetic pulse effects when used in nuclear hardened military applications. Since this system cannot sense the fuel setting of a CI engine, it would only predict the maximum possible power assuming a full fuel setting, however, this is commonly the operating point of most interest. Likewise any power comparisons would only be valid for the same engine speed. Look-up tables and functions empirically determined can be incorporated to provide more versatile comparisons at various engine speeds and accelerator settings.

Figure 2:
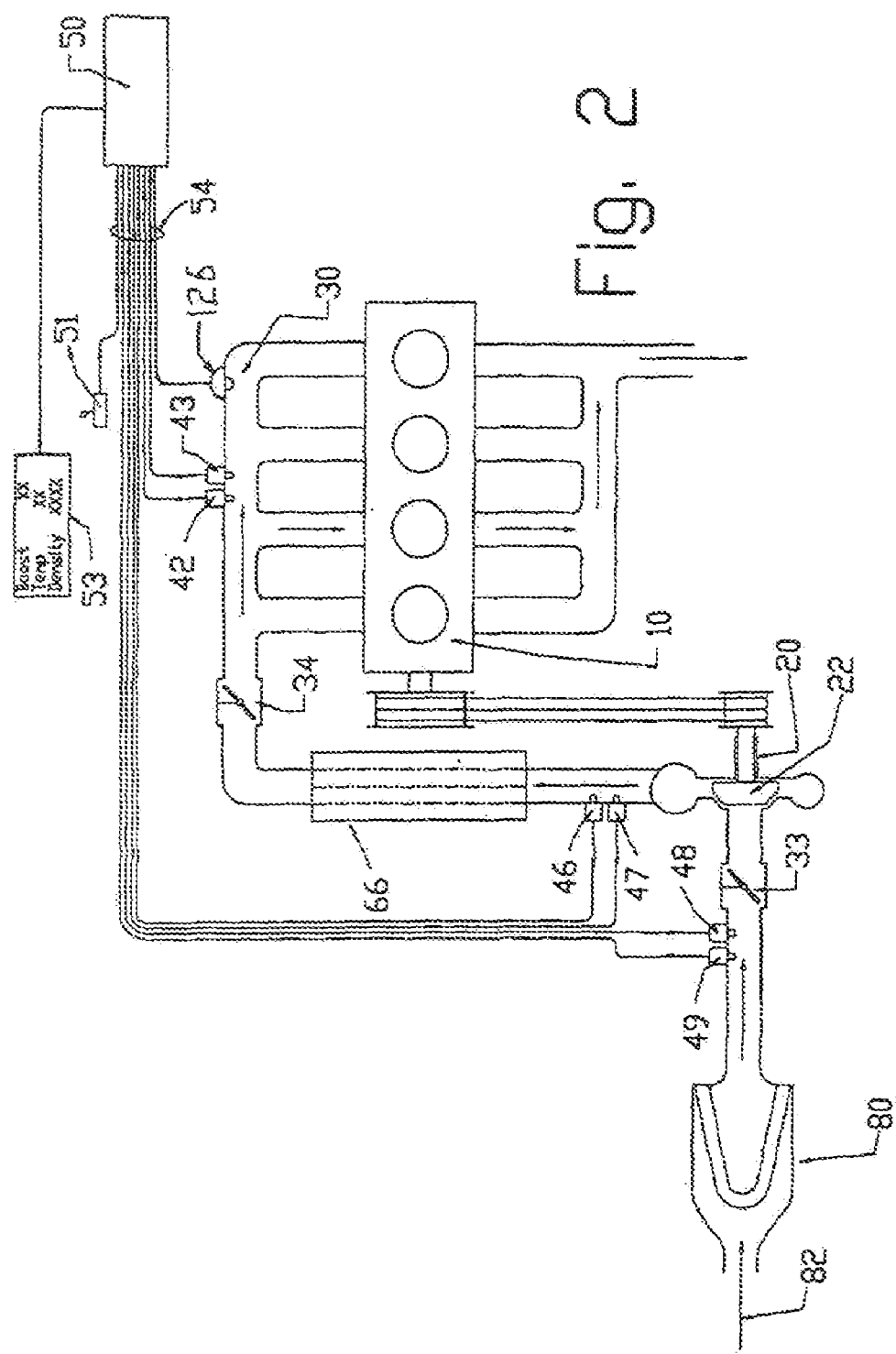
FIG. 2 is a schematic view of an internal combustion engine with two density increasing devices in series in the intake, with electronic sensors, a discrete processor, and a display.

FIG. 2 shows a similar schematic with the addition of a second density changing device, a charge air cooler 66 in series with the supercharger 20. The charge air cooler cools the airflow, and hence increases the density after it exits the 1st stage intake air compressor 22 on its way to the intake manifold 30 through an intake manifold throttle 34.

This embodiment uses electrical sensors in close mutual proximity to sense the pressure and temperature values at various points throughout the system to generate an output as a function of density at selected locations. An intake air ambient density sensor includes a temperature sensor 48 and a pressure sensor 49 to measure incoming conditions to the intake. The air is then compressed and read again by the 1st stage density sensor including a temperature sensor 46 and a pressure sensor 47. The air is read a third time after the air is cooled by the charge air cooler 66 where the resulting density increase is measured in the intake manifold by combined data from the intake manifold temperature sensor 42 and the intake manifold pressure sensor 43. This embodiment would also work if a single sensor capable of sensing density directly were substituted for the pair of discrete temperature and pressure sensors at each location depicted in FIG. 2.

Each pair of sensors generates an electrical output signal as a function of density and including pressure and temperature components which are communicated individually through a wiring harness 54 to a display. A converter operating as a density gauge processor unit 50 converts the discrete temperature and pressure sensor signals to density and/or power output, or density and/or power output gain or loss values, and then outputs this data to a display panel 53. The operator can provide data input to the processor 50, via the position of the selector switch 51, which determines which data and presentation format, or units, the operator wishes to view.

This embodiment would lend itself to retrofitting an engine that had no original equipment instrumentation, as well as applications where a density-changing device is being retrofitted as a performance upgrade. In such cases, the processor portion of the system 50 could incorporate an add-on engine processor that controlled the retrofit performance upgrade system, which commonly requires data from manifold pressure and temperature sensors to modify the amount of fuel provided, and would thereby simplify the implementation of the retrofitted system.

Figure 3:
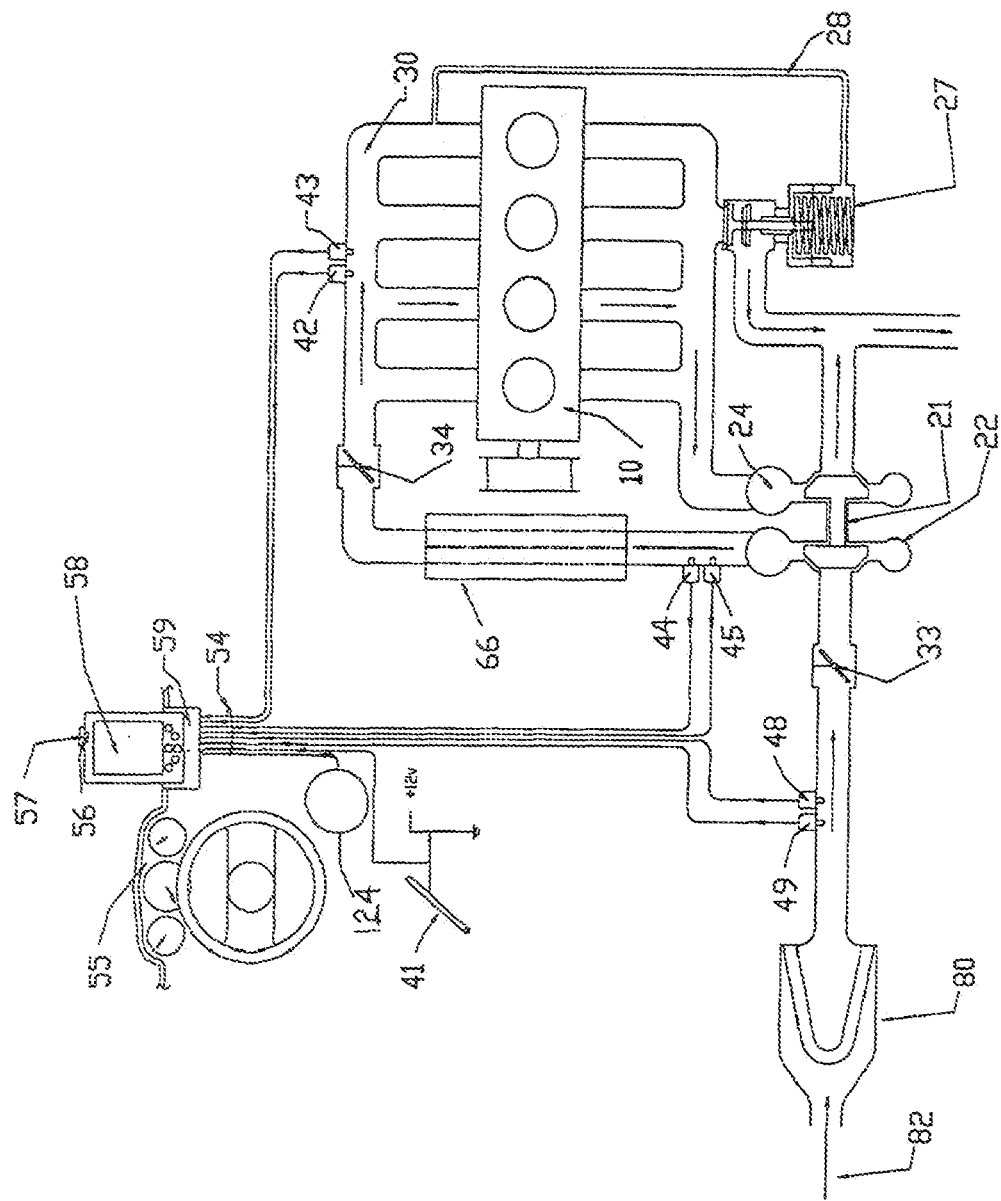
FIG. 3 is a schematic view of an internal combustion engine with two density increasing devices in series in the intake with electronic sensors and a dash mounted digital processor providing operator input, display, and processing functions.
Figure 4:
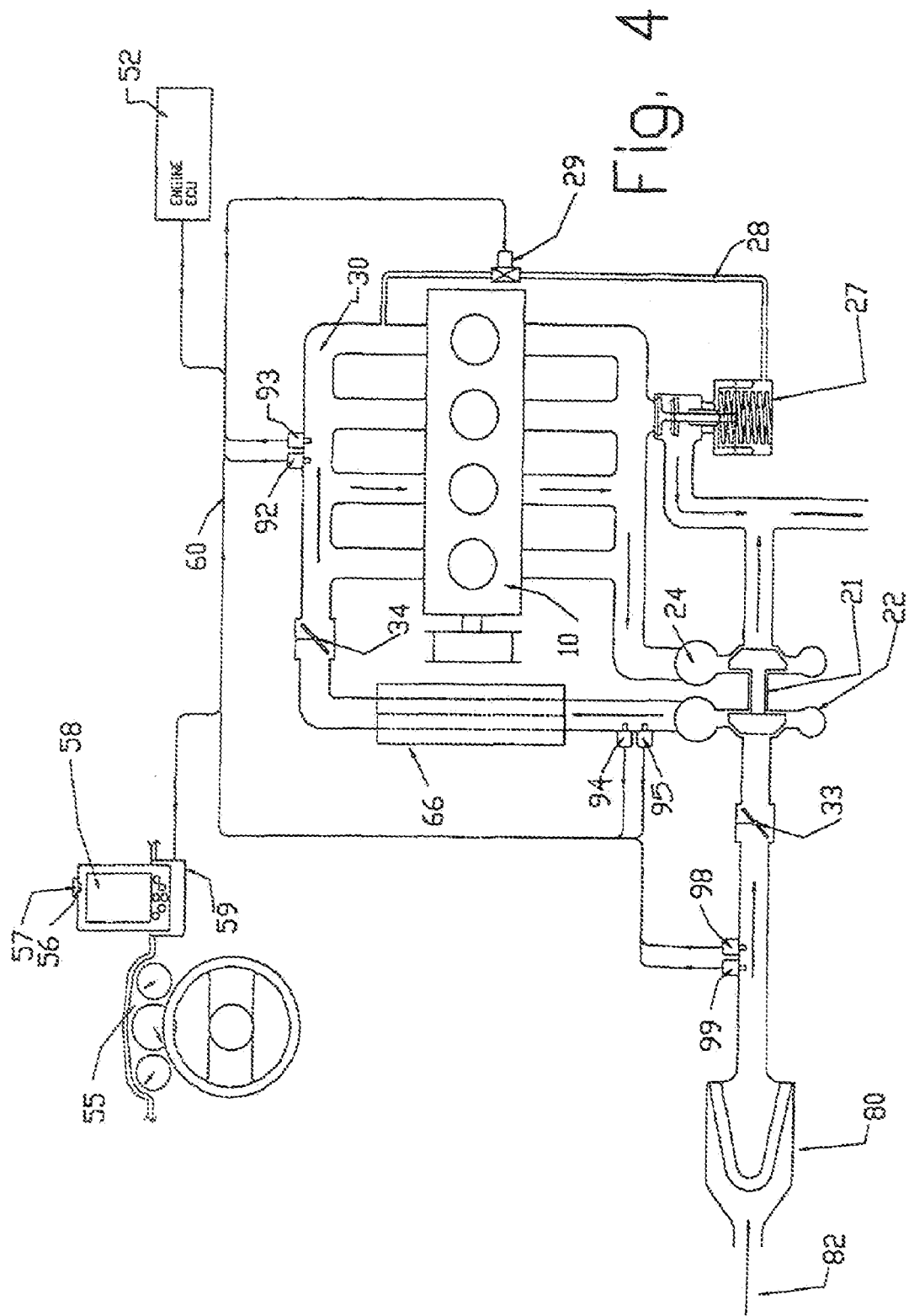
FIG. 4 is a schematic view of an internal combustion engine with two density increasing devices in series in the intake with digital data bus type electronic sensors, and a dash mounted digital processor.

FIGS. 3 and 4 show schematics of two systems of indicating performance on an internal combustion engine 10 similar to FIG. 2, except that the engine depicted employs a 1st stage turbocharger 21 with a 1st stage intake air compressor 22 in place of the mechanically driven supercharger 20 shown in FIG. 2. The supercharger of FIG. 2 derives the power needed to drive the 1st stage intake air compressor 22 from the internal combustion engine 10 through a mechanical link. The turbocharger in FIGS. 3 and 4 derives the power needed for the 1st stage intake air compressor 22 from the energy in the internal combustion engine exhaust by running the exhaust through a turbine 24.

The power delivered to the compressor 22 and, therefore, the compressor output pressure is controlled by selectively bypassing some exhaust flow around the turbocharger turbine through a wastegate valve 27. Pressure levels in the intake manifold 30 are sensed through a wastegate pressure line 28, which provides a feedback signal to control the position of the wastegate valve 27 to maintain a preselected pressure level in the intake manifold 30.

Both systems provide air density sensors by locating sensors in close proximity for temperature and pressure at the inlet (sensors 48, 49 in FIGS. 3 and 98, 99 in FIG. 4), after the 1st stage compressor 22 but before the charge air cooler 66 (44, 45 in FIGS. 3 and 96, 97 in FIG. 4) and then again in the intake manifold (42, 43 in FIGS. 3 and 92, 93 in FIG. 4) with each density sensor providing an output signal of temperature and pressure data as a function of density. A analog throttle position sensor (41) or similar device captures the power level requested by the operator needed to calculate power at less than full load conditions for CI applications. The engine speed data for assisting in the calculation of power at various speeds can be sensed from the ignition (SI), the fuel injection (electronic controlled CI), a hall effect sensor, a crankshaft position sensor, a camshaft position sensor, an alternator, a tach generator, and similar means appropriate to the engine type. A speed sensor feed 124 provides the speed signal to the display in FIG. 3 and the engine control unit (ECU) 52 is a speed signal source in FIG. 4.

Figure 8:
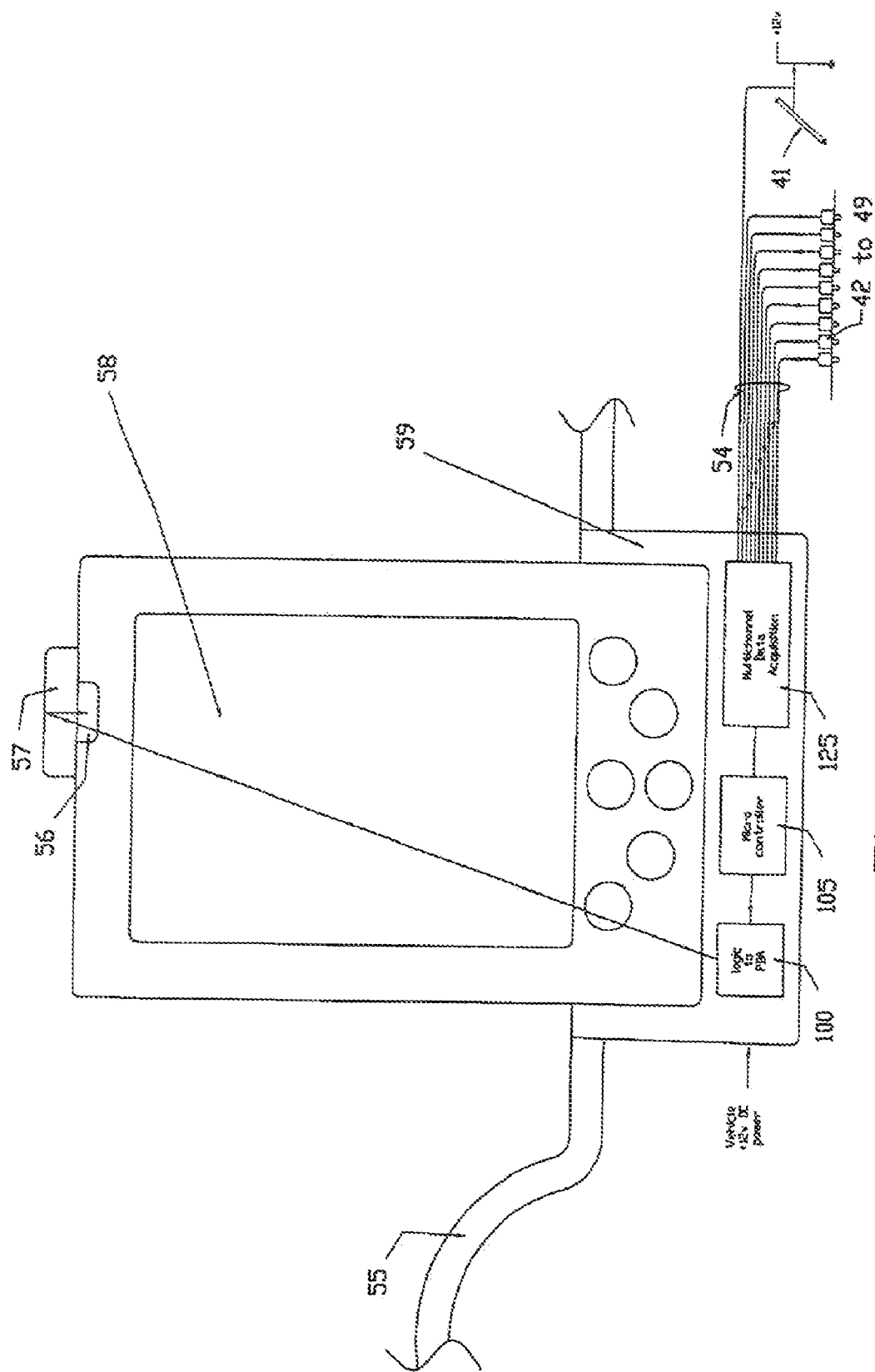
FIG. 8 is a schematic view and logic diagram of a dash mounted PDA interfacing with conventional analog sensors.

The difference in these systems is that the system of FIG. 3 produces an analog voltage or current output that has a separate wire for each sensor in the harness 54 and multichannel data acquisition circuitry 125 illustrated in FIG. 8 to convert these analog signals to a digital form compatible with the converter and digital processor inside the PDA 58.

FIG. 4 depicts digital air density sensors by locating pairs of temperature and pressure sensors 92, 93, 94, 95, 98, 99 in close proximity for temperature and pressure that can communicate with the engine ECU 52 over a data bus 60, and do not have discreet wires for each sensor, multiplexing, or analog to digital conversion. These digital data buses 60, however, typically operate at different signal levels than data processors to increase their immunity to outside electrical interference, and still has an interfaces circuit to communicate with current PDA designs. In some applications this will allow the use of existing sensors that may be present on modern electronic controlled engines to provide the needed data. The power level requested by the operator and engine speed can also be obtained from the ECU 52, eliminating the need for reading the accelerator position or a speed sensor.

Figure 5:
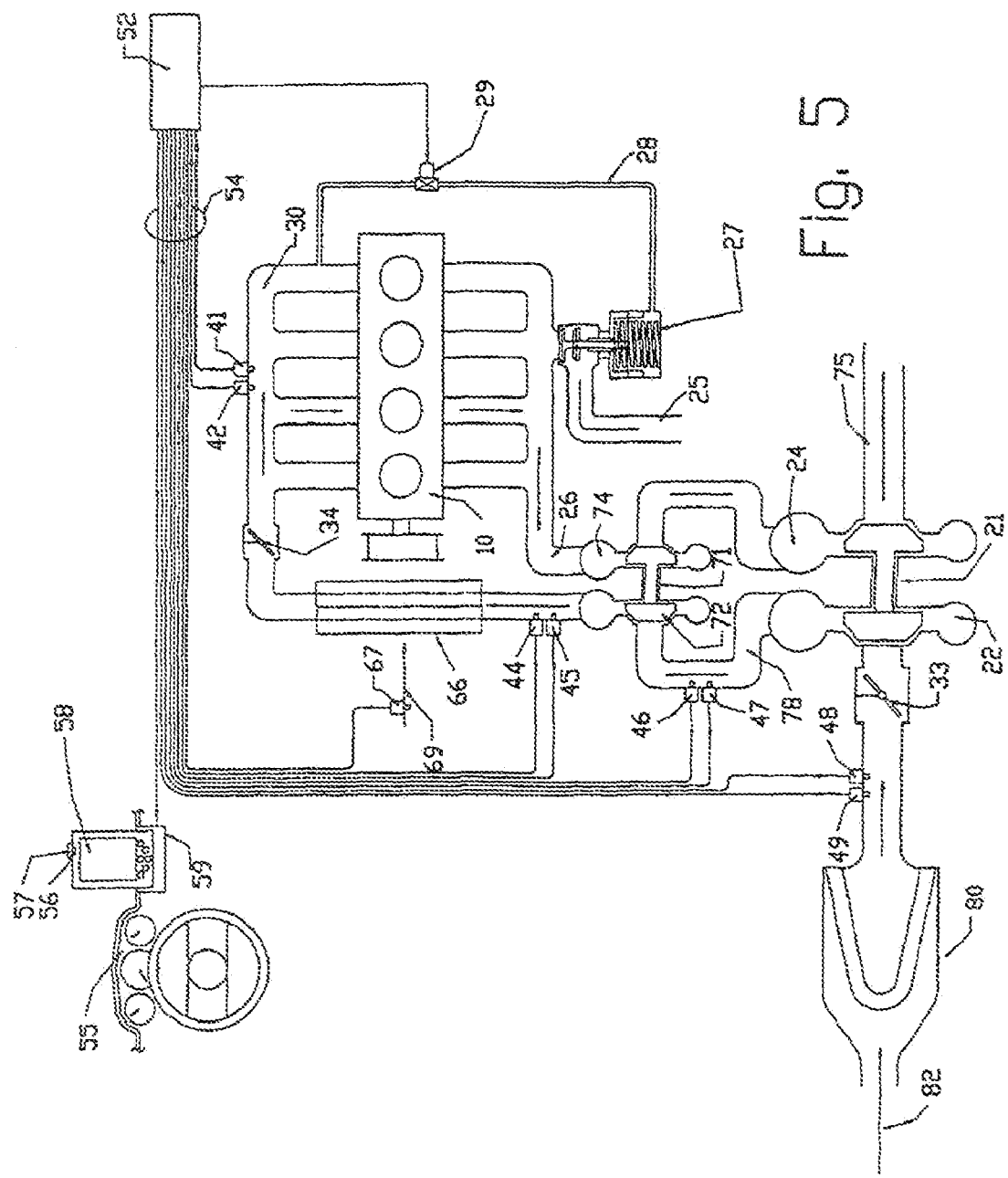
FIG. 5 is a schematic view of an internal combustion engine with three density increasing devices in series with sensors in between the multiple stages and an engine control module.

FIG. 5 shows a schematic of an internal combustion engine 10 with an additional 2nd stage turbocharger 71 added in series to the 1st stage turbocharger 21. An additional digital air density sensor is provided by locating a pair of sensors 46 and 47 in the duct 78 between the discharge of the 1st stage air compressor 22 and the inlet to the $2^{nd}$ stage air compressor 72. A temperature sensor 67 senses the cooling medium 69 entering the charge air cooler 66. This figure depicts an embodiment where the analog sensors are read directly by the engine control processor 52, and the density is determined for display from data obtained from the diagnostic port on the engine processor 52 through an OBD II (or similar) data communications link. 61 This embodiment would also lend itself to being incorporated into a retrofit system to add an additional density-changing device as a performance upgrade. In such cases, the processor function of the density gauge system could be incorporated into a retrofitted engine control processor 52, making the gauge system an integral part of the upgrade package. In this embodiment the engine speed and the power level requested by the operator can be obtained from the ECU 52 directly, eliminating the need for reading the engine speed or the accelerator position sensor 41 for the purposes of calculating CI engine power at part load.

FIGS. 3 through 8 also depict 3 common variations on the preferred embodiment of the system utilizing a PDA 58, or a similar small computer capable of providing the operator input, converter and processor functions, memory, and the display for the system. The PDA 58 is mounted in a PDA cradle and interface 59, and is mounted to the vehicle dashboard 55 for easy viewing and operation by the vehicle operator. The cradle can interface with the PDA 58 via the PDA's infrared interface port 56 through the PDA cradle's corresponding infrared interface port 57 as seen in FIG. 8. This reduces the sensitivity to the motion of the PDA relative to the cradle that can be induced by vibration from the vehicle. This relative motion between the cradle and the PDA can deteriorate the quality of the electrical connection at the base of the PDA where it plugs into the cradle with mechanical contacts that can wear as a result of the vibration.

The system is intended to be a permanently installed gauge, although the cradle allows the PDA itself to be easily removed and used as a normally functioning PDA when the vehicle is not in use. This also allows the needed program to operate the system to be installed initially, and then to be easily updated by the user as new versions of the program become available. These programs can be downloaded from a floppy disk, CD, or Flash drive included with the system, or downloaded directly from the manufacturer's website. The programs would initially be downloaded into a personal computer, and then downloaded into the PDA's memory using the same personal computer to PDA interface hardware that was originally supplied with the PDA for this purpose. Depending on the communication capability of the PDA chosen, some of the logic block functions shown in the following figures that interface sensor data to the PDA may be performed within the PDA. In all cases, the PDA will have been pre-programmed to start automatically upon power up of the internal combustion engine, request which data the operator wants to see, read the corresponding sensors, calculate the requested values, and then present it to the operator on the PDA screen in the visual display format selected.

Figure 6:
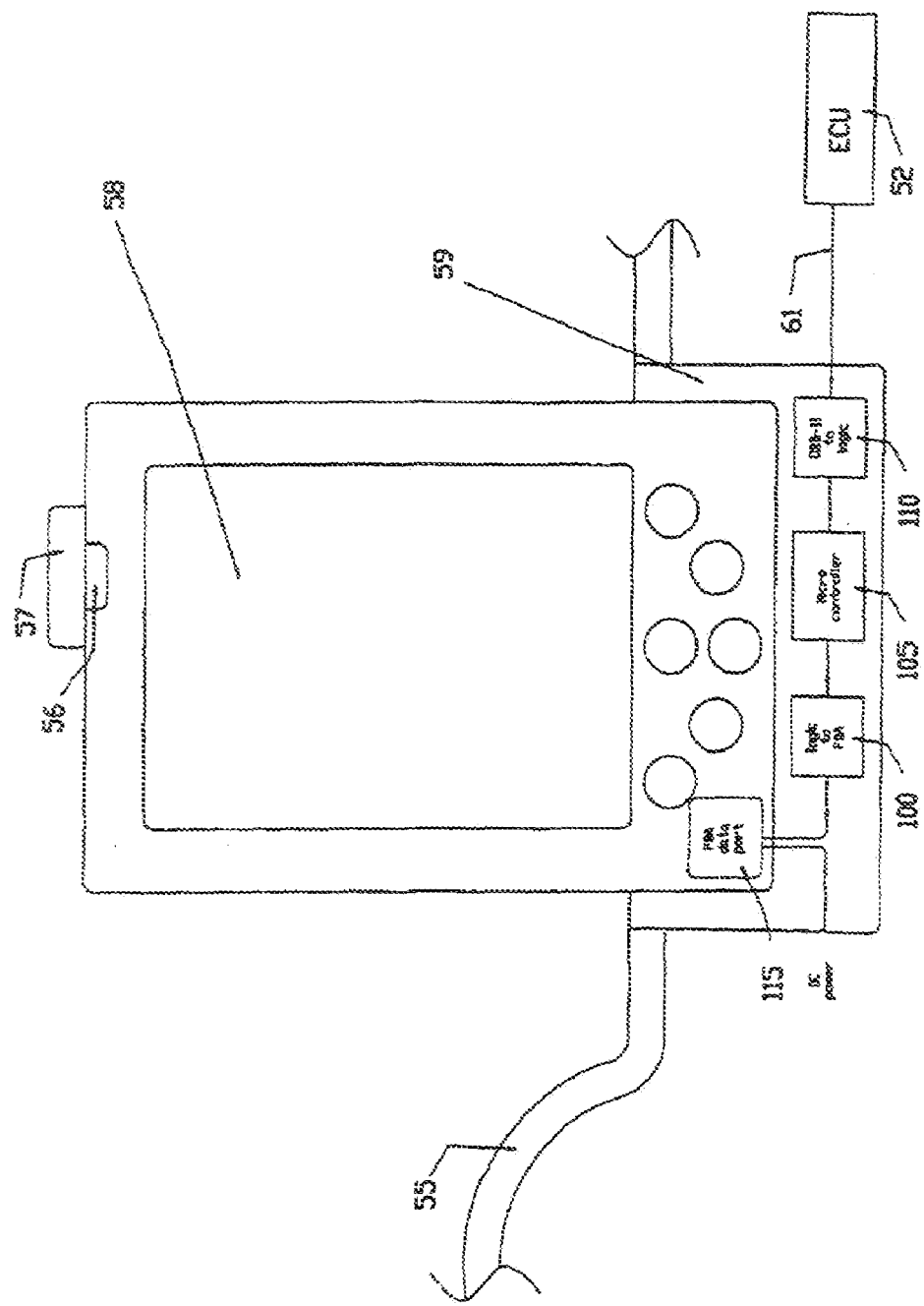
FIG. 6 is a schematic view and logic diagram of a dash mounted PDA interfacing with an engine control module diagnostic data output port.

FIG. 6 shows a block diagram of the PDA adapter cradle used with an overall system as depicted in FIG. 5 where the system reads the data it needs from the engine processor 52. The first block 110 would convert the electrical interface format used by the engine processor (e.g., OBD-II, 61 etc.) to a logic level. The next block is a micro controller 105 that would convert the data format to one compatible with the PDA. A logic-to-PDA interface circuit 100 would then convert the microcontroller electronic output logic level to one compatible with the PDA. This version communicates to the PDA through a PDA data port electrical plug with mechanical contacts 115.

Figure 7:
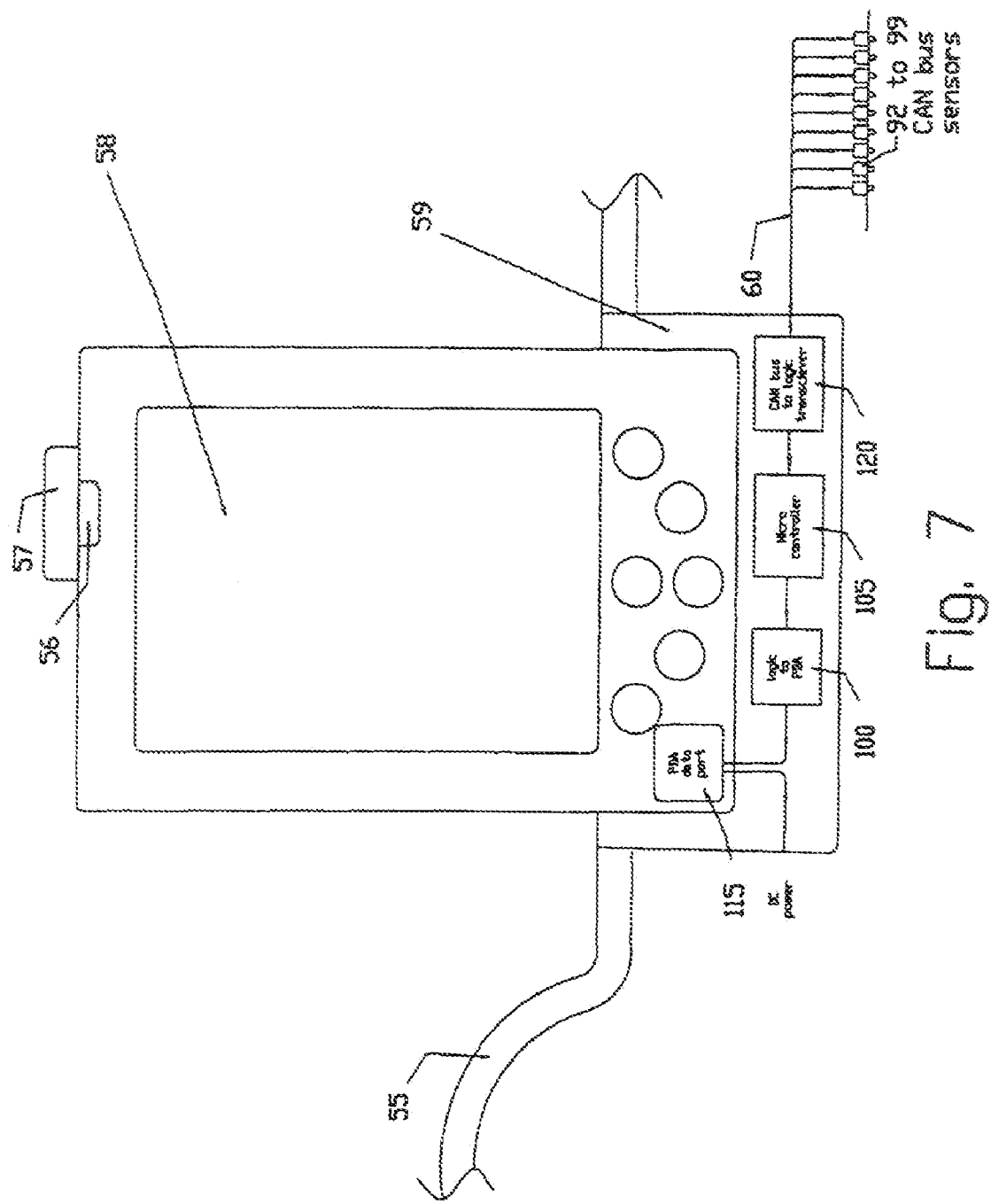
FIG. 7 is a schematic view and logic diagram of a dash mounted PDA interfacing with a digital data bus.

FIG. 7 shows a block diagram of the PDA adapter cradle used with an overall system as depicted in FIG. 4, where the system reads the data it needs from the digital sensors through the engine's digital data bus 60. This data bus could also be retrofitted if any or all of the advantageously included sensors were not originally present on the engine. The first block 120 converts the digital sensor data bus signals to a logic level the microcontroller can read. (e.g. a CAN bus transceiver) The next block is a micro controller 105 that converts the data format to one compatible with the PDA. A logic-to-PDA interface circuit 100 would then convert the microcontroller electronic output logic level to one compatible with the PDA. This embodiment communicates to the PDA through a PDA data port electrical plug with mechanical contacts 115.

FIG. 8 shows a block diagram of the PDA adapter cradle used with an overall system as depicted in FIG. 3 where the system reads the data it needs from analog sensors with a multichannel analog to digital data acquisition circuit 125 through a wiring harness 54. The multichannel analog to digital data acquisition circuit 125 then feeds the microcontroller 105 that then sends the data to the PDA 58 through the PDA cradle side infrared interface port 57 to the PDA's infrared interface port 56. This embodiment demonstrates that a system with multiple density increasing devices would further benefit from the ability to display any combination of the power levels, the absolute density, the gain or loss in density, the temperature, or the pressure at any point in the system, as well as the drop or increase in these values across each density changing device.

The equations for converting the raw sensor data to actual temperature, pressure, and density values depend on the type of sensor used. These equations are typically industry standard, or obtained from the sensor manufacturer. The density of dry air measured at a standard temperature and pressure is generally considered to be 1.2 kg/m$^3$ (0.075 lb/ft$^3$) measured at 21.1 C (70 F) and 101.3 Pa (29.92 in. HgA). To calculate the density at other temperatures and pressures, multiply the density by the ratios (actual P air/101.3)*((21.1+273.1)/(actual T air+273.1)) where Temp=C, Press=Pa. The density ratio is the density under current conditions divided by the density at a reference condition. This ratio is dimensionless.

The percentage density gain or loss would commonly be calculated in one of two ways. One method, the reference point is defined as idle, or "zero" power, and full power without a boosting device would approach 100%. This would always register as a gain or be "positive". Boosting the power above this would provide a power gain of over 100%. This approach would commonly be used in aircraft, or similar applications where the ambient reference conditions change frequently, and where a quickly interpreted "safe maximum power" reference independent of the current ambient conditions is most critical to the operator. The second approach would set the reference conditions equal to be 100% power, and any gain or loss from these conditions would be indicated as positive or negative. This would be useful where changes from a reference point were important, such as testing the performance change resulting from an intentional change in the system. Conversely, this format would also quickly alert the operator to an unintentional performance change, such as might result from an impending failure in part of the system.

The simplest approximation of engine power change for a spark ignition (SI) engine using density gain or loss is the density percentage multiplied by the power produced at the reference density at a given engine speed. This estimate will be low because the losses from friction, thermal, and pumping losses do not increase proportionately with density, so the power increase will actually be greater than calculated. A more accurate method would be to multiply the density by the power at the reference density without the losses, then subtract the losses from the new value. The losses vary from one internal combustion engine to another, and could be modeled for each engine using industry standard methods (SAE J13490, etc.) for internal combustion engine measurements. This calculation assumes that the engine control system will change the amount of fuel being injected as density changes to maintain the narrow range of air/fuel ratio required by a SI engine. A gauge application with a multi speed engine would also use a speed input to calculate power.

Compression Ignition (CI) or Diesel engines can run at a wider range of air/fuel ratios than SI engines, and this must be taken into account when calculating power. If sufficient air is present to burn all of the fuel being supplied, increasing the intake air density will not cause any corresponding increase in power. Power can still be calculated, but sensing the amount of fuel being supplied is required. The fuel rate can be determined by sensing the throttle position sensor, 41 sensing the injector pulse width, sensing the fuel injection pump rack position, obtaining the fueling rate information from the engine control unit 51 or a power train control unit through the data bus, 60 or the OBD II communications link 61, etc. As is the case with an SI engine, a gauge for a multi speed CI engine would also need a speed input to calculate the engine power at various engine speeds.

Systems that are equipped with a compressor, like a supercharger or turbocharger, could be monitored for temperature and pressure rise, and from this data the compressor efficiency could be calculated and displayed. Compressor efficiency for air=T in [((P out/P in)$^{286}$)−1]/(T out−T in). See also SAE J1826. Similarly, systems equipped with a charge air cooler, or similar heat exchanger could be monitored for the performance of the heat exchanger, and this value calculated and displayed. This would require one additional temperature sensor in the flow of the cooling medium (air, water, coolant, etc,) to calculate the heat exchanger performance. Heat exchanger effectiveness=(T in−T out)/(T in−T cooling medium). See also SAE J1148. The compressor and charge cooler performance information would be useful for assessing the effect of component changes, but should not change during normal operation. These values would therefore provide an immediate indication of a malfunction if they did change.

The values displayed can be fixed during manufacture, or be changeable by the operator. It could be set change automatically from one to the next in sequence, again either preset, or as selected by the operator. The display could also be programmed to change automatically like an alarm, to display a value that exceeds a desired range to alert the operator to the condition that has either been preset, or set by the operator. The displayed information can be used by the operator to assist in internal combustion engine output control, as well as monitoring performance of each component in the system, and the overall system performance in real time. The operator would have the option to select which data or combination of data to view depending on the area of interest at the time.

Humidity can be monitored. It is the only significant natural variable in the constituent mixture as applied to conventionally employed engines. As humidity affects power, it can be factored in regarding power estimates, again through empirically developed functions particular to each engine or type of engine. The humidity typically does not affect the Ideal Gas formula. Therefore, where the power estimate is intended as a comparative measurement of a change in performance of the intake system or density changing devices therein, humidity is not consequential. The humidity reading from a sensor 126, as shown in FIG. 2, may be used where appropriate in this context. The power output can be modified to account for humidity by using a function of humidity to vary the density as applied to the predicted power output. Electronic humidity sensors are contemplated in an engine environment.

Another engine parameter which provides information useable for performance indications is flow rate of air through the engine. Changes in the engine valve setting or in the exhaust side of the engine can impact flow. As flow impacts the amount of oxygen available for combustion, changes in performance can be impacted by flow as well as density. The sensor 126, as shown in FIG. 2, can represent a flow meter used for indicating changes in flow impacting performance.

The foregoing disclosure deals with the efficiency of the intake side of the engine. To achieve power estimates, an assumption is made that the remainder of the engine, from the intake valves and ignition through the muffler, remains constant. This assumption is quite valid unless changes are made which are not part of the intake up to the intake valves. One such change that occurs during operation of certain engines is variations in effective engine displacement. Fuel economy for a multi-cylinder internal combustion engine can be improved by deactivating some of the engine cylinders under certain operating conditions. Reducing the number of operating cylinders reduces the effective displacement of the engine. This is sometimes referred to in the art as a variable displacement engine.

Depending upon the particular configuration of the variable displacement engine, one or more cylinders may be selectively deactivated by a controller. The controller generates a signal which is used to send a signal to the gauge processor to indicate the current displacement. The gauge processor in this configuration creates a displacement factor to adjust the performance calculation. This factor can be the actual displacement divided by maximum displacement or can be empirically determined for specific engines is the effect is found not to be linear.

FIG. 4 can be used to depict a variable displacement engine 10 where the displacement is controlled by selectively deactivating cylinders under control of the ECU 52. The ECU 52 would provide a variable displacement signal indicative of the displacement through the data bus 60 to the PDA 58 to allow the actual displacement to be incorporated into the performance calculations. The data bus 60 may also actuate the various engine components that effect a cylinder shutdown. The PDA 58 can monitor these engine cylinder shutdown commands via the data bus 60.

Thus, measurement and display of engine performance as a function of density as method and apparatus are disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An internal combustion engine comprising
 a variable volume internal combustion engine including an intake with air flow therethrough;
 an air density sensor disposed in the intake and producing an output signal that is a function of the density of the air in the intake;
 a converter capable of receiving the output signal and converting the output signal to a calculated output which is a function of the power of the internal combustion engine based at least in part on the output signal.

2. The internal combustion engine of claim 1, the air density sensor including a gas tight flexible container disposed within the intake, a gas disposed within the flexible container, a predetermined quantity of which is selected to produce a pressure that is a function of the density of the air in the intake, a pressure sensor sensing the pressure of the gas within the flexible container and generating the output signal.

3. The internal combustion engine of claim 1, the air density sensor including a pressure sensor producing a pressure signal and a temperature sensor producing a temperature signal, the pressure sensor and the temperature sensor being in close proximity in the intake, the pressure signal and the temperature signal being the output signal.

4. The internal combustion engine of claim 3 further comprising
 a humidity sensor in communication with the display and including a humidity signal that is a function of the humidity in the inlet.

5. The internal combustion engine of claim 1 further comprising
 a plurality of said air density sensors producing a plurality of output signals, respectively, the intake including at least one density changing device, at least one of the air density sensors being upstream of the at least one density changing devices and at least another of the air density sensors being downstream of the at least one density changing devices.

6. The internal combustion engine of claim 5, the at least one density changing device being a compressor.

7. The internal combustion engine of claim 5, the at least one density changing device being a compressor and a charge air cooler.

8. The internal combustion engine of claim 1 further comprising
 additional sensors of internal combustion engine operating conditions selected from a group consisting of fuel rate being supplied to the internal combustion engine, power level requested by an operator, flow rate of air through the engine and internal combustion engine speed.

9. A system for indicating the performance of an internal combustion engine having an intake with air flow therethrough, comprising
 an air density sensor disposed in the intake and producing an output signal that is a function of the density of the air in the intake;
 a converter capable of receiving the output signal and converting the output signal to a calculated output which is a function of the power of the internal combustion engine based at least in part on the output signal.

10. The system of claim 9, the air density sensor including a gas tight flexible container disposed within the intake, a gas disposed within the flexible container, a predetermined quantity of which is selected to produce a pressure that is a function of the density of the air in the intake, a pressure sensor sensing the pressure of the gas within the flexible container and generating the output signal.

11. The system of claim 9, the converter being a PDA.

12. The system of claim 9, the air density sensor including a pressure sensor producing a pressure signal and a temperature sensor producing a temperature signal, the pressure signal and the temperature signal being the output signal.

13. The system of claim 12 further comprising
 a humidity sensor in communication with the display and including a humidity signal that is a function of the humidity in the inlet.

14. A method for displaying the performance level of an internal combustion engine having an intake, comprising
 sensing the density of the air flowing in the intake;
 generating an output signal that is a function of the density sensed;

converting the density signal to a calculated output which is a function of the power of the internal combustion engine based at least in part on the output signal.

15. A method for displaying the performance level of an internal combustion engine having an intake, comprising sensing the density of the airflow entering the internal combustion engine at one or more locations selected from a group consisting of intake air flow in an intake manifold, intake air flow upstream of a density changing device, intake air flow downstream of a density changing device, and the intake air flow in between any two density changing devices;

generating output signals that are a function of at least the density at the sensor locations;

converting the output signals to a calculated output which is a function of the effectiveness of at least one density changing device of the internal combustion engine based at least in part on the output signal.

16. The method of claim 15 further comprising converting the density signal to a calculated output which is a function of the performance of the internal combustion engine based at least in part on the output signals;

sensing additional operating conditions selected from a group consisting of fuel rate being supplied to the internal combustion engine, power level requested by an operator, air flow rate through the engine and internal combustion engine speed;

correcting the internal combustion engine performance calculated to account for the additional sensed data.

17. The method of claim 16 further comprising sensing the humidity of the airflow;

generating signals that are a function of humidity of the airflow, calculating engine performance including modifying density as a function of humidity of the airflow.

18. The method of claim 16 further comprising sensing a variable displacement signal;

correcting the internal combustion engine performance calculated to account for the variable displacement signal.

* * * * *